Figure 1:
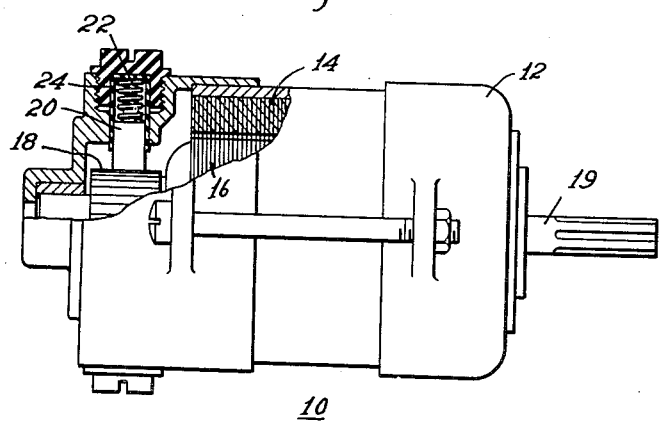

Jan. 21, 1947.  H. M. ELSEY  2,414,514
DYNAMOELECTRIC APPARATUS BRUSH
Filed Oct. 20, 1943

WITNESSES:

INVENTOR
Howard M. Elsey.
BY
ATTORNEY

Patented Jan. 21, 1947

2,414,514

UNITED STATES PATENT OFFICE 2,414,514

DYNAMOELECTRIC APPARATUS BRUSH

Howard M. Elsey, Oakmont, Pa., assignor to Westinghouse Electric Corporation, East Pittsburgh, Pa., a corporation of Pennsylvania Application October 20, 1943, Serial No. 506,962

18 Claims. (Cl. 171—325)

This invention relates to dynamoelectric apparatus, such as motors and generators, and more particularly to brushes capable of cooperating with electrical current collecting and distributing devices provided on dynamoelectric machines to give a life comparable with the other parts of the apparatus.

This application is a continuation in part of my application Serial No. 475,122, filed February 8, 1943.

Under ordinary atmospheric conditions, motors and generators and similar dynamoelectric apparatus employing carbon or graphite contact members in combination with rotating current collectors of copper may function satisfactorily for prolonged periods of time. Under conditions approximating high altitude conditions, for example, altitudes of from 30,000 to 40,000 feet and higher and a dew point of about $-50°$ C., it has been found that all known carbon or graphitic electrodes or brushes will wear away with extreme rapidity and disintegrate into carbon dust in a short period of time. This wearing of the brushes is generally described as dusting. In some cases, a set of brushes will be reduced to an inoperative condition in a few minutes of operation.

Adverse conditions leading to dusting and rapid wear of carbon brushes may take place under other operating conditions, as in railway motors where severe operating conditions lead to rapid wear requiring frequent replacement of the brushes. In many instances conventional brushes in this service break up mechanically into large fragments as compared to dusting.

In operating aircraft at high altitudes, it has been discovered that the phenomenon of rapid wear and dusting of brushes is a serious limiting factor. At the present time, it is usually necessary to replace used brushes with a complete new set of brushes in each piece of electrical apparatus after short flights of aircraft at altitudes of about 30,000 feet or higher. Prolonged flights at high altitudes are rendered unsafe and, in some cases, cannot be maintained due to the disintegration of carbon brushes employed in the dynamoelectric apparatus in the aircraft.

The object of this invention is to provide a carbon brush that will operate satisfactorily in combination with a metallic current collector under atmospheric conditions similar to those generally found at high altitudes without excessive wear or dusting.

Another object of the invention is to provide carbon brushes and electrodes which will resist wear under atmospheric conditions that vary widely in temperature and moisture content.

A further object is to provide for embodying in carbon bodies substantially non-hygroscopic metallic halide salts which will react with copper current collectors to prevent undue wear and dusting of the carbon bodies when employed as brushes in dynamo-electric apparatus under adverse conditions.

A still further object of the invention is to provide a carbon brush for coacting with a current collector to provide for improved performance and increased life of both.

Other objects of the invention will, in part, be obvious and will, in part, appear hereinafter.

Figure 2:
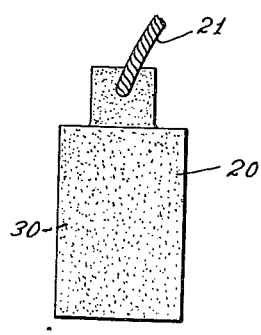

For a better understanding of the nature and objects of this invention, reference should be had to the drawing in which:

Figure 1 is a view in elevation, partly in section, of an electrodynamic device; and Fig. 2 is a view in elevation of a carbon brush.

Referring now to the drawing and Fig. 1 in particular, 10 designates a dynamoelectric device, such as a generator, suitable for use in airplanes which now often operate at altitudes of 30,000 feet to 40,000 feet or higher. The device 10 comprises an outer casing 12 supporting a relatively fixed stator 14. Inside the stator 14, mounted on a drive-shaft 19, is a rotor 16 having the customary windings for carrying electrical current. For the purpose of conducting electrical energy from the windings, the rotor 16 carries a current collector 18, illustrated as consisting of a plurality of copper commutator segments. Electrical current from the current collecter 18 is taken off by means of the carbon brush 20 disposed to make sliding contact on the surface thereof. The carbon brush 20 is biased toward the collector 18 by the spring 22 disposed within a brush housing 24.

When the brush 20 is of the carbon or electrographitic construction normally available and sold to the trade and is operated upon a current collector 18 of copper under conditions corresponding, for instance, to 40,000 feet altitude, the brush 20 wears at an excessive rate. A cloud of fine carbonaceous dust will be produced by the action of the current collector 18 on the brush 20. Experience has shown that the rate of wear or dusting increases with length of operation under such conditions. Even in the case of slip rings having an initial highly polished and uniform circumferential surface, the action of the copper on the conventional brush under these high altitude conditions results in a high rate of dusting. It is common to get brush wear of the order of one-tenth inch per hour at altitudes of 30,000 feet. At higher altitudes, the dusting is so severe that the brush may be worn in a few minutes operation beyond the allowable amount for satisfactory functioning.

It has been found that the rate of dusting of brushes under high altitude conditions is affected by the amount of electrical current passing through the brush. Under conditions found at moderate altitudes corresponding to around 20,000 feet, a brush designed to carry a maximum current of 200 amperes may operate for many hours at 25 to 50 ampere loads with not much more than normal wear. However, when a load of around 200 amperes is applied, the wear increases so greatly that the effective life of a given brush may be only a few hours.

Under the conditions corresponding to 40,000 feet altitude, the rate of brush wear may be high for even lightly loaded brushes, while for brushes carrying maximum current the dusting is ordinarily excessive and the life of the brush so short that it is very dangerous for operation of aircraft.

In the present invention, carbon brushes or bodies are treated with substantially non-hygroscopic halide salts of metals to increase their resistance to wear and dusting when employed in dynamoelectric machines at high altitudes or under conditions simulating high altitudes.

Halide salts suitable for the practice of this invention are exemplified by lead iodide, copper chloride, cadmium iodide, silver iodide, cadmium bromide, and potassium iodide. Brushes impregnated with substantially non-hygroscopic metallic halide salts may be applied to dynamoelectric apparatus to give long and trouble-free service under the most adverse conditions.

It appears that under usual atmospheric operating conditions, that is, at ordinary pressures and water-vapor content, a film of copper oxide forms on the copper current collectors. It has been found that when a film of copper oxide is formed on a current collector that the film functions much as a lubricant and the wear of carbon or graphitic brushes is greatly reduced when compared to the wear that results when there is no oxide film.

It is believed that, when brushes impregnated with or carrying metallic halide salts are employed with an operating current collector at high altitudes or under similar atmospheric conditions, a high enough temperature is generated at the point of contact to cause the decomposition of the salts and a halogen gas or vapor is evolved which attacks the copper and a copper-halide film is formed on the collector. When this halide film is formed, it is unstable under operating conditions, and in the presence of the atmosphere, even though it be a rarefied atmosphere, it breaks down leaving a film of copper oxide which is not as destructive to the carbon brushes as unoxidized copper. Therefore, there appears to be a cooperation between the brushes carrying a metallic halide salt and the copper current collector which results in a greatly increased life of the brush. This invention, therefore, promotes the formation of a thin surface film of copper oxide which is requisite to a satisfactory cooperation of a copper commutator with a carbon brush.

It is to be understood that this theory of operation of the halide salts in the brushes is simply an explanation of what I believe takes place, and I do not wish to be bound by such explanation.

Whatever the true explanation or reason may be, by experience I have found that the halide salts are highly satisfactory and successful in reducing excessive wear and dusting. For instance, an ordinary carbon brush that wore at the rate of 0.07 inch per hour under a given set of high altitude conditions wore at a rate of less than 0.0005 inch per hour under the same conditions when treated with cadmium iodide.

There are several methods available of applying the metallic halides to carbon electrodes to produce the invention. One highly effective method is to impregnate the brushes by immersing them in either a concentrated aqueous solution of metallic halide salt or from a melted halide salt bath. It has been discovered that electrographitized brushes have a somewhat more porous structure than non-graphitized brushes, and this porosity expedites the application of the salts for satisfactory impregnation of electrographitized brushes therewith. Brushes in which metals are combined with graphite are not sufficiently porous to permit entirely satisfactory impregnation at all times with molten metal halides or solutions thereof. It is easier to treat electrographitized brushes by impregnation.

Referring to Fig. 2 of the drawing, there is illustrated a brush 20 to which the invention has been applied. Attached to the brush 20 is a flexible copper conductor 21 or the like for conducting electrical current to or from the brush when connected to a suitable terminal. In one form of the invention the brush 20, after having been cut to shape ready for use, may be treated with a metallic halide salt to introduce throughout a substantial portion thereof a predetermined amount of this salt. In some cases, graphitized plates of carbon may be impregnated with a metallic halide before cutting into brush shape.

In one method of producing the brush 20, a metallic halide salt may be dissolved in water or other suitable volatile solvent to produce a substantially saturated solution having a high metallic halide content. A carbon brush is immersed in the strong salt solution for a period of time sufficient to enable the solution to penetrate the pores of the brush. On removing the brush from the solution and heating to remove the water or other solvent by evaporation, a quantity of metallic halide salt will be deposited in the pores of the brush. The process may be repeated if required until sufficient metallic halide has been put into the brush. Brushes so produced have been operated in conjunction with a rotating current collector of copper with a highly satisfactory reduction of dusting under adverse conditions.

In order to apply a larger quantity of the salt to the brush somewhat more rapidly and economically, it has been found that the use of melted metallic halide salts is frequently preferable. For example, carbon brushes may be immersed in molten cadmium iodide for about one hour and sufficient cadmium iodide will be absorbed to suit it for use under the high altitude conditions described hereinbefore. Brushes impregnated with cadmium iodide in this manner have been successfully operated in contact with a copper current collector at conditions corresponding to 40,000 feet altitude and −50° C. dew point for long periods of time without appreciable wear over that normally occurring at ground conditions.

To reduce the time of impregnation and to introduce a predetermined quantity of halide salt into each brush, it may be desirable to make use of the process disclosed in the copending patent application of L. E. Moberly, entitled "Process for treating carbon brushes," Serial No. 475,132, filed February 8, 1943. As disclosed therein, the individual brushes of carbon plates may be laid flatwise and a predetermined weight of metallic halide salt deposited on the surface of the brush, and the brushes heated to a temperature sufficient to melt the salt. The molten halide salt will diffuse into the electrographitic body and distribute itself throughout in a more or less uniform fashion. This process is highly effective.

Treated brushes may be produced by molding carbonaceous material and the metallic halides, with or without metal additions, such as powdered copper, and heat treating at temperatures below the vaporization temperatures of the metallic halide employed. This last process is particularly satisfactory for making brushes which are not of a porous structure when fully baked as compared to electrographitic brush structure. Metallic halides of high melting temperature or only slightly soluble in liquids such as water, may be more conveniently incorporated in brushes by mixing in the carbon flour, molding into a body and heat treating.

The quantity of substantially non-hygroscopic metallic halide salt required to reduce dusting under high altitude conditions is of the order of 10% of the weight of the brush. In some instances, more than 10% by weight has been employed with great success. Lead iodide applied to brushes in an amount equal to about 45% to 50% of the weight of the brush has resulted in a brush that operated under a wide range of conditions, with wear being measurable only in a few ten-thousandths of an inch per hour of use. For moderate altitudes 10% or less of halide salt usually will give good results.

Metallic halide salts need not be applied to the entire brush 20 shown in Figure 2, but will be effective when impregnating only the current collector engaging portion 30. In some cases the halide salt may be applied to one face of the portion 30 without fully impregnating the entire thickness. It is generally desirable to impregnate the full width of the brush so that the entire surface of the current collector comes in contact with the metallic halide carried by the brush.

When applied to dynamoelectric apparatus operating on the earth's surface, brushes with only a few percent of halide salt will not only last longer than untreated brushes but will impart other benefits. Tests have shown that if a portion of all the brushes in contact with one commutator or current collector carry a metal halide, the benefits of the invention, such as a reduction in the wear of all the brushes operating on the commutator, will generally result.

Investigation of railway service revealed that the conventional brushes employed with a standard type of motor had a life of about 27,000 miles in everyday service. Brushes of the same make and type were obtained and treated until they carried about 3% lead iodide. The rate of wear of the treated brushes was greatly reduced and based on present data the treated brush has a life of about 120,000 miles.

When applied to another railway motor a given grade of carbon brush conventionally employed in this service wore $\frac{1}{16}$ of an inch in about 1,000 miles of operation. The same grade of carbon brush when treated with 3% lead iodide wore about $\frac{1}{16}$ of an inch in approximately 10,000 miles of operation.

Other benefits besides reduction in rate of brush wear, and consequent reduction in the frequency of brush replacement, follow the use of metallic halide treated brushes. Motor and generator commutators and slip rings will be found to be much smoother and superior in operating characteristics following the use of metallic halide containing brushes.

As an example of the improvement in current collectors, the metallic halide treated brushes of this invention were installed in a railway motor whose commutator at the time of installation was in so rough a condition as to normally call for redressing. After operating several thousand miles, the commutator was examined and found to be decidedly improved. In fact its rating was changed to class A. The commutator exhibited a copper film such as is associated with good performance and showed no evidence of bar burning. There was no difference in the contact areas on the commutator with two rows of brushes whereas previously the respective peripheral portions of the commutator had differed markedly, showing uneven current distribution.

Street railway, subway railway and other transportation equipment motors will benefit by the use of the brushes of this invention. High-speed exciters and other high-speed dynamo-electric devices will be found to operate more satisfactorily with metallic halide carrying brushes. Machine tool motors, such, for example, as used to drive roughing lathes may be advantageously equipped with the brushes disclosed herein. Less dressing, machining and rebuilding of commutators and slip rings will be required by using the brush of the invention in combination therewith.

The proportion of metallic halide salt for surface dynamo-electric apparatus may vary from about 2% to 8% by weight for most purposes. In some cases brushes having 0.7% metal halide have given indications of good results as compared to brushes without the metallic halides.

While the coaction between the present brush and current collector is not completely understood there definitely is such coaction or cooperation between the brush and current collectors as to increase the life of both. It appears that the present brush in some way produces a beneficial coating or film on the current collectors.

One or more of the following metal halides may be introduced into brushes with good results:

| | |
|---|---|
| $PbI_2$ | $CdBr_2$ |
| $PbBr_2$ | $CdCl_2$ |
| $PbCl_2$ | $HgI_2$ |
| $PbF_2$ | $HgBr_2$ |
| $CaF_2$ | $Cu_2Br_2$ |
| $CdF_2$ | $KI$ |
| $MgF_2$ | $AgI$ |
| $CdI_2$ | |

Mixtures of the halide salts may be applied to brushes to produce results as effective as obtained by the use of a single salt.

Depending on the operating conditions, some metal halides will be preferable to others. For example, if the brushes operate under relatively high temperatures, some halides having a high vapor pressure at such temperature may not remain in the brush as long as halide with a lower vapor pressure.

In practicing the invention it has been found that deliquescent metallic halides are undesirable. The deliquescent halides are those which absorb sufficient amounts of moisture from the atmosphere to form liquid solutions. The presence of moisture does not appear to assist in the attainment of the ends of the invention. Likewise hygroscopic halides which absorb significant quantities of moisture and become quite damp are not desirable for use in brushes.

Deliquescent and significantly hygroscopic metallic halides if incorporated in brushes may lead to adverse results in many cases. If the brushes stand for a period of time, the aqueous solution formed by absorption from the atmosphere will escape from the brush. In this condition the brush may have insufficient halide to accomplish its intended purpose. In other cases the undue absorption of moisture by the metallic halide may produce undesirable physical changes in the brush structure due to expansion on absorption of water with a consequent sticking or freezing in the brush box or holder. Weakening or disintegration of the brush may occur if a deliquescent or substantially hygroscopic metal halide is incorporated therein.

Some hygroscopic metal halides such, for example, as zinc chloride, are extremely corrosive with water present and in such combination will corrode excessively the brush holders, commutators and other portions of the dynamo-electric apparatus with which they come into contact. The electrical insulation may be adversely affected by such metal halide solutions.

In practicing this invention deliquescent metallic halides should not be used and significantly hygroscopic halides should be avoided. In the specification and claims the term "substantially non-hygroscopic" is intended not to apply to but to exclude both deliquescent halides and halides which absorb significant amounts of moisture.

In applying the metallic halide salts to carbon brushes by impregnation with the melted salt, the factors of viscosity of the melted salt, its wetting of carbon and melting temperature are factors to consider.

Since the metallic radical of the salt is separated from the halide radical and left within the body of the carbon brush, it is desirable to select salts in which the metallic radical does not produce a harmful deposit or react with the atmosphere or brushholder to give a deleterious product. For instance, while both potassium fluoride and potassium iodide reduced excessive brush dusting and wear under the high altitude operating conditions as disclosed, the products derived from the decomposition of the salt led to several other minor shortcomings in that the contact drop became higher and sparking increased. It is believed that in the reaction with the oxygen and moisture present in the air the metal formed a hydroxide which interfered with the completely successful commutation of the apparatus. Other metals, such as lead, cadmium or silver, accordingly may be preferable on this account, since they do not give rise to undesirable end products.

Many iodide, chloride, fluoride and bromide compounds will be operative when applied to brushes, and accordingly an exhaustive enumeration thereof need not be given. The compounds may be applied in various ways to suit manufacturing and other conditions. An essential feature of the invention is to so incorporate the compound that under operating conditions a reaction is secured with the copper current collector whereby the action of the current collector on the brushes is modified to reduce wear and dusting.

Since certain changes may be made in the above invention, and different embodiments of the invention may be made without departing from the scope thereof, it is intended that all matter contained in the above disclosure or taken in connection with the accompanying drawing shall be interpreted as illustrative and not in a limiting sense.

I claim as my invention:

1. A treated carbon brush for operating in sliding contact with a conducting metal surface comprising in combination a porous carbon body and a substantially non-hygroscopic metallic halide salt incorporated in the carbon body.

2. A treated carbon brush for operating in sliding contact with a conducting metal surface comprising in combination a porous carbon body and a substantially non-hygroscopic metallic halide salt embodied in at least a portion of the porous carbon body.

3. A treated carbon brush for operating in sliding contact with a conducting metal surface comprising in combination a porous carbon body and a substantially non-hygroscopic metallic halide salt, the porous carbon body being at least partially impregnated with the metallic halide salt.

4. An electrographitic brush capable of operating in contact with a rotating current collector of copper under conditions corresponding to 40,000 feet altitude and a dew point of $-50°$ C. without excessive wear or dusting, the brush comprising a body of graphite and an effective amount of a substantially non-hygroscopic metal halide incorporated therewith.

5. A carbon brush for operating in sliding contact with a conducting metal surface comprising a body of carbon and from 0.1% by weight and higher of a substantially non-hygroscopic metallic halide incorporated therewith.

6. A carbon brush for operating in sliding contact with a conducting metal surface comprising a body of carbon and about 10% to 50% by weight of a substantially non-hygroscopic metallic halide incorporated therewith.

7. A current transmitting brush for operating in sliding contact with a conducting metal surface comprising a carbon base and a substantially non-hygroscopic metallic halide salt distributed in the carbon, the whole being consolidated into a body of predetermined shape.

8. In combination, a current collector of a dynamo electric machine, the current collector composed of copper, and a carbon brush partially impregnated with a substantially non-hygroscopic metallic halide salt disposed in cooperative relation with the current collector, the metallic halide salt and the copper being capable of chemically reacting to provide a combination which results in a long life of the brush.

9. In combination a current collector of a dynamo-electric machine, the current collector composed of copper, and a graphitic brush impregnated with a substantially non-hygroscopic metallic halide disposed in cooperative relation with the copper current collector, the metallic halide and the copper being capable of chemically reacting to provide a combination which results in a long life of the graphitic brush.

10. In combination a current collector of a dynamo-electric machine, the current collector composed of copper, and a graphitic brush impregnated with 0.1% by weight and higher of a substantially non-hygroscopic metallic halide disposed in cooperative relation with the copper current collector, the metallic halide and the copper being capable of chemically reacting to provide a combination which results in a long life of the graphitic brush.

11. In combination a current collector of a dynamo-electric machine, the current collector composed of copper, and a graphitic brush impregnated with about 10% to 50% by weight of a substantially non-hygroscopic metallic halide disposed in cooperative relation with the copper current collector, the metallic halide and the copper being capable of chemically reacting to provide a combination which results in a long life of the graphitic brush.

12. In combination a current collector of a dynamo-electric machine, the current collector composed of copper, and a graphitic brush impregnated with about 0.7% to 8% by weight of a substantially non-hygroscopic metallic halide disposed in cooperative relation with the copper current collector, the metallic halide and the copper being capable of chemically reacting to provide a combination which results in a long life of the graphitic brush.

13. A brush for operating in sliding contact with a conducting metal body comprising a carbon body and a lead halide incorporated in the carbon body to cooperate with the conducting metal body.

14. A brush for operating in sliding contact with a conducting metal surface comprising a carbon body and lead iodide incorporated in the carbon body.

15. A brush for operating in sliding contact with a conducting metal body comprising a carbon body and a cadmium halide incorporated in the carbon body to cooperate with the conducting metal body.

16. A brush for operating in sliding contact with a conducting metal surface comprising a carbon body and cadmium iodide incorporated in the carbon body.

17. The method of making an electrical contact element including forming a porous block of electrically conductive carbonaceous material, and impregnating at least a part of the porous block with cadmium iodide.

18. The method of making an electrical contact element including forming a porous block of electrically conductive carbonaceous material, and impregnating at least a part of the porous block with molten cadmium iodide.

HOWARD M. ELSEY.